United States Patent
Butler et al.

(10) Patent No.: US 6,956,071 B2
(45) Date of Patent: Oct. 18, 2005

(54) USE OF ALTERNATE THIOL ACCELERATORS FOR CROSSLINKING RUBBER IN ASPHALT

(75) Inventors: James R. Butler, Friendswood, TX (US); Bill Lee, Humble, TX (US)

(73) Assignee: Fina Technology, Inc., Houston, TX (US)

(*) Notice: Subject to any disclaimer, the term of this patent is extended or adjusted under 35 U.S.C. 154(b) by 48 days.

(21) Appl. No.: 10/327,404

(22) Filed: Dec. 20, 2002

(65) Prior Publication Data

US 2004/0122136 A1 Jun. 24, 2004

(51) Int. Cl.⁷ .............................................. C08L 95/00
(52) U.S. Cl. ............................ 524/68; 524/70; 524/71
(58) Field of Search ................................ 524/68, 70–71

(56) References Cited

U.S. PATENT DOCUMENTS

| | | | |
|---|---|---|---|
| 3,803,066 A | 4/1974 | Petrossi | |
| 4,130,516 A | 12/1978 | Gagle et al. | |
| 4,145,322 A | 3/1979 | Maldonado et al. | |
| 4,242,246 A | 12/1980 | Maldonado et al. | |
| 5,037,868 A | * 8/1991 | Saito et al. | .................... 524/93 |
| 5,371,121 A | 12/1994 | Bellomy et al. | |
| 5,382,612 A | 1/1995 | Chaverot et al. | |
| 6,025,418 A | 2/2000 | Defoor et al. | |
| 6,180,697 B1 | 1/2001 | Kelly et al. | |
| 6,310,122 B1 | 10/2001 | Butler et al. | |

OTHER PUBLICATIONS

SUPERPAVE Series No. 1 (SP–1), Asphalt Institute, 1997.

* cited by examiner

*Primary Examiner*—Peter Szekely
(74) *Attorney, Agent, or Firm*—Madan, Mossman & Sriram PC; Tenley R. Krueger

(57) ABSTRACT

It has been discovered that certain nitrogen-containing thiols other than mercaptobenzothiazole (MBT) perform equivalently as accelerators in preparing asphalt polymer compositions. Typically, the crosslinker in these compositions is sulfur. Nitrogen-containing thiols containing at least one functional group —N═(SH)— have been found to be useful alternate accelerators along with activators such as zinc oxides. Particular nitrogen-containing thiols include, but are not necessarily limited to, 2-mercaptobenzoxazole (MBO), 2-mercapto-5-methyl-1,3,4-thiadiazole (MMTD), and combinations thereof.

17 Claims, No Drawings

USE OF ALTERNATE THIOL ACCELERATORS FOR CROSSLINKING RUBBER IN ASPHALT

FIELD OF THE INVENTION

The present invention is related to hydrocarbon-based binders, such as bitumens, asphalts and tars, modified with elastomers, and including a vulcanized stage, which are particularly useful as industrial coatings and road bitumens, or the like. It relates more particularly to processes for obtaining vulcanized compositions based on bitumens and on styrene/butadiene copolymers that use accelerators.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, toughness, tenacity and ductility. Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including, but not necessarily limited to, permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents such as sulfur, frequently in the form of elemental sulfur. It is believed that the sulfur chemically couples the polymer and the bitumen through sulfide and/or polysulfide bonds. The addition of extraneous sulfur is required to produce the improved stability, even though bitumens naturally contain varying amounts of native sulfur.

Thus, U.S. Pat. No. 4,145,322, issued Mar. 20, 1979 to Maldonado et al., discloses a process for preparing a bitumen-polymer composition consisting of mixing a bitumen, at 266–446° F. (130–230° C.), with 2 to 20% by weight of a block copolymer, having an average molecular weight between 30,000 and 300,000, with the theoretical formula $S_x$-$B_y$, in which S corresponds to styrene structure groups and B corresponds to conjugated diene structure groups, and x and y are integers. The resulting mixture is stirred for at least two hours, and then 0.1 to 3% by weight of sulfur relative to the bitumen is added and the mixture agitated for at least 20 minutes. A quantity of added sulfur cited in this patent is 0.1 to 1.5% by weight with respect to the bitumen. The resulting bitumen-polymer composition is used for road-coating, industrial coating, or other industrial applications.

Similarly, U.S. Pat. No. 4,130,516, issued Dec. 19, 1978 to Gagle et al., discloses an asphalt (bitumen) polymer composition obtained by hot-blending asphalt with 3 to 7% by weight of elemental sulfur and 0.5 to 1.5% by weight of a natural or synthetic rubber, in one embodiment a linear, random butadiene/styrene copolymer. U.S. Pat. No. 3,803,066, issued Apr. 9, 1974 to Petrossi, also discloses a process for preparing a rubber-modified bitumen by blending rubber, either natural or synthetic, such as styrene/butadiene rubber, with bitumen at 293–365° F. (145–185° C.), in an amount up to 10% by weight based on the bitumen, then adjusting the temperature to 257–320° F. (125–160° C.), and intimately blending into the mix an amount of sulfur such that the weight ratio of sulfur to rubber is between 0.3 and 0.9. A catalytic quantity of a free-radical vulcanization-accelerator is then added to effect vulcanization. This patent recites the critical nature of the sulfur to rubber ratio, and teaches that weight ratios of sulfur to rubber of less than 0.3 gives modified bitumen of inferior quality.

Although polymer-modified bitumen compositions are known, these previously described compositions are not necessarily useful for road paving applications. For example, mixing NorthWest paving asphalt having an initial viscosity of 682 poise at 140° F. (60° C.) with 3.6 weight percent Kraton®-4141, a commercially available styrene-butadiene tri-block copolymer which contains 29 weight percent plasticizer oil, and 0.25% sulfur gives a modified-asphalt composition with a viscosity of 15,000 poise at 140° (60° C.). This viscosity, however, greatly exceeds the acceptable viscosity range set by specifications issued by the Federal Highway Administration requiring bitumen compositions to have a viscosity in the range of 1600–2400 poise at 140° F. (60° C.). Thus, the modified bitumen compositions produced by the procedures of U.S. Pat. No. 4,145,322 using Kratone®-4141 would be unacceptable for use in road paving under these specifications.

The second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

A third factor complicating the use of bitumen compositions concerns the use of volatile solvents in such compositions. Specifically, while such solvents have been heretofore proposed as a means to fluidize bitumen-polymer compositions containing relatively small amounts of sulfur which compositions are designed as coatings (Maldonado et al., U.S. Pat. No. 4,242,246), environmental concerns restrict the use of volatile solvents in such compositions. Moreover, the use of large amounts of volatile solvents in bitumen compositions may lower the viscosity of the resulting composition so that it no longer meets viscosity specifications designated for road paving applications. In addition to the volatile components, reduction of other emissions during asphalt applications becomes a target. For example, it is desirable to reduce the amount of sulfur compounds that are emitted during asphalt applications.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and usually have raised softening point, increased visco-elasticity, enhanced force under strain, enhanced strain recovery, and improved low temperature strain characteristics as compared with non-modified asphalts and asphalt emulsions.

The bituminous binders, even of the bitumen/polymer type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting. Such current processes are discussed in various patents such as U.S. Pat. No. 4,145,322 (Maldonado); U.S. Pat. No. 5,371,121 (Bellomy); and U.S. Pat. No. 5,382,612 (Chaverot), all of which are hereby incorporated by reference.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

It is common in the preparation of polymer-modified asphalts to include activators and accelerators to make the crosslinking reaction proceed faster. Zinc oxide (ZnO) is a conventional activator, and mercaptobenzothiazole (MBT) is a conventional crosslinker accelerator. ZnO is also sometimes used to control the tendency of the polymer to gel. The zinc salt of mercaptobenzothiazole (ZMBT) combines features of both of these conventional additives. Zinc oxide is a relatively expensive component.

In view of the above, bitumen compositions, which simultaneously meet the performance criteria required for road paving, and which use an alternative accelerator to mercaptobenzothiazole (MBT) would be advantageous. Because all asphalts are different, it is helpful to have alternative crosslinking promoting additives available, since one or more of the alternative choices may give a particularly improved or optimized polymer modified asphalt (PMA). Additionally, having available a variety of different activators for bitumen compositions would provide versatility. In preparing the composition, significant mixing is needed to insure the uniform addition of both the polymer and any crosslinking agents, accelerators or activators. The crosslinking agents and other agents are usually added as a dry powder and mixed with the asphalt compositions.

As can be seen from the above, the art is replete with methods to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a goal of the industry to reduce the cost of the polymers and crosslinking agents added to the asphalt without sacrificing any of the other elements.

SUMMARY OF THE INVENTION

In carrying out these and other objects of the invention, there is provided, in one form, a method for preparing asphalt and polymer compositions involving heating an asphalt, adding a polymer to the asphalt, adding a crosslinker to the polymer, adding an activator to the polymer, where the activator is present in an amount sufficient to improve crosslinking, and adding an accelerator in an amount sufficient to improve crosslinking, where the accelerator is a nitrogen-containing thiol having the functional group —N=C(SH)—, in the absence of MBT. In many cases, ZnO is a suitable activator.

In another embodiment of the invention, there is a method for preparing asphalt and polymer compositions involving heating an asphalt; adding a polymer to the asphalt; adding a crosslinker to the polymer; adding an activator to the polymer; and adding an accelerator in an amount sufficient to improve crosslinking, where the accelerator is 2-mercaptobenzoxazole (MBO), 2-mercapto-5-methyl-1,3,4-thiadiazole (MMTD), 2-mercaptobenzimidazole, thiourea, 2-mercaptothiazoline, mercaptobenzothiazole (MBT), and combinations thereof where at least MMTD or MBO is included as an accelerator. The order or sequence of addition of the activator, crosslinker, activator and accelerator is not critical or important.

In another embodiment of the invention, there are provided asphalt and polymer compositions made by the process described above.

DETAILED DESCRIPTION OF THE INVENTION

It has been surprisingly discovered that certain nitrogen-containing thiols successfully compatibilize rubber and asphalt in the presence of a ZnO activator, alternative to MBT. These alternative nitrogen-containing thiols provide another set of materials to use to enhance the usage of rubber in difficult asphalts. As noted, the chemical nature of asphalts varies greatly from source to source, and thus it is necessary and desirable to have a variety of crosslinking additives available to ultimately provide a system or matrix of additives that will compatibilize rubber with any asphalt.

More specifically, the nitrogen-containing thiols of this invention are those compounds that have the functional group —N═C(SH)—. Mercaptobenzothiazole (MBT) happens to contain this functional group, but it is a known accelerator and its sole use is outside the scope of this invention. Examples of nitrogen-containing thiols of this invention include, but are not necessarily limited to, 2-mercaptobenzoxazole (MBO), 2-mercapto-5-methyl-1,3, 4-thiadiazole (MMTD), 2-mercaptobenzimidazole, thiourea, 2-mercaptothiazoline, and the like and mixtures thereof. However, it will be appreciated that in some applications, it may be desirable or necessary to use a blend of accelerators and that the blend of the accelerators of this invention together with MBT is considered to be within the scope of some of the claims of this invention.

The accelerators of this invention can be added in various forms such as dry components, in an oil dispersion, or as a water emulsion. The emulsion or dispersion may have a crosslinking chemicals content of about fifty percent or more and is stable during shipping and storage. In one non-limiting embodiment, the dispersion is an oil dispersion comprising about forty percent (40%) active ingredients. In another non-limiting embodiment, the dispersion comprises an oil dispersion wherein the oil has a flash point above 450° F. (252° C.) and is liquid at room temperature. The accelerators are added to the polymer in an amount sufficient to improve crosslinking. Therefore, as used herein, the terms "crosslinking agents," "crossliker" and "accelerator" are interchangeable. The crosslinking agents utilized in one non-limiting embodiment comprised nitrogen-containing thiol accelerator: ZnO (zinc oxide): S (sulfur) in a 1:2:8 weight ratio. In another non-limiting embodiment of the invention, the nitrogen-containing thiol accelerator is present in an amount ranging from about 0.005 wt. % to about 0.3 wt. % based on the asphalt, alternatively from about 0.06% to about 0.2 wt. %.

The effect of the accelerators of this invention to promote crosslinking is enhanced by the presence of activators such as ZnO. Activators work with the accelerators to direct the reaction and make the vulcanization reaction even faster. Accelerators are necessary for activators to work. Activators may be present in an amount ranging from about 0.01 to about 0.3 weight percent based on the asphalt. There are known in the art several other classes of accelerators that include, but are not necessarily limited to, thiazole derivatives, thiurams, dithiocarbamates, and combinations thereof.

It is not critical that the crosslinker(s), activator(s) and/or accelerator(s) be added in any particular sequence, in other words, they may be added in any order.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Suitable bitumens have an initial viscosity at 140° F. (60° C.) of 600 to 3000 poise depending on the grade of asphalt desired. One penetration range (ASTM D5) of the base bitumen at 77° F. (25° C.) is 50 to 320 dmm, where an alternate penetration range is from 75 to 150 dmm, when the intended use of the copolymer-bitumen composition is road paving. Bitumens that do not contain any copolymer, sulfur, etc., are sometimes referred to herein as a "base bitumen."

As used herein, the term "volatile solvent" refers to a hydrocarbon solvent that has a distillation point or range that is equal to or less than 350° C. Such solvents are known to vaporize to some extent under ambient conditions and, accordingly, pose environmental concerns relating to hydrocarbon emissions. The term "substantially free of volatile solvent" means that the complete (final) bitumen composition contains less than about 3.5 weight percent of volatile solvent. In one non-limiting embodiment, the bitumen composition contains less than about 2 weight percent of volatile solvent and alternatively, the bitumen composition contains less than about 1 weight percent of volatile solvent.

"Elastomeric Polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and conjugated dienes. In one non-limiting embodiment of the invention, styrene/conjugated diene block copolymers are used that are linear, radial, or multi-branched. Styrene/butadiene and styrene/isoprene copolymers having an average molecular weight of between 30,000 and 300,000 have been found to be particularly useful in the present invention.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that are copolymers are represented by the formula:

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known in the art. Such tri-block copolymers may be derived from styrene and a conjugated-diene, wherein the conjugated-diene is butadiene or isoprene. Such copolymers may contain 15 to 50 percent by weight copolymer units derived from styrene, alternatively may contain 18 to 35 percent derived from styrene, and in another non-limiting embodiment of the invention may contain 20 to 31 percent derived from styrene, the remainder being derived from the conjugated diene. These copolymers may have a number average molecular weight range between 50,000 and 200,000, and may alternatively have a number average molecular weight range between 80,000 and 180,000. The copolymer can employ a minimal amount of hydrocarbon solvent in order to facilitate handling. Examples of suitable solvents include plasticizer solvent that is a non-volatile aromatic oil. However, when the hydrocarbon solvent is a volatile solvent (as defined above), care should be taken to ensure that the amount of solvent contained in the final bitumen composition is less than about 3.5 weight percent.

The term "sulfur" is defined herein as elemental sulfur in any of its physical forms or any sulfur-donating compound. Sulfur-donating compounds are well known in the art and include various organic compositions or compounds that generate sulfur under the mixing or preparation conditions of the present invention. In one non-limiting embodiment, the elemental sulfur is in powder form known as flowers of sulfur. Other sulfur species that can be used in combination with the metal oxides of the invention include, but are not necessarily limited to mercaptobenzothiazole (MBT), thiurams, and the like, and combinations thereof. In another non-limiting embodiment of the invention, the sulfur is present in an amount ranging from about 0.06% to about 0.3 wt. % based on the asphalt, alternatively present in an amount ranging from about 0.1 to about 0.2 wt. %.

The term "desired Rheological Properties" refers to bitumen compositions having a viscosity at 140° F. (60° C.) of from 1600 to 4000 poise before aging.

By "storage stable viscosity" it is meant that the bitumen composition shows no evidence of skinning, settlement, gelation, or graininess and that the viscosity of the composition does not increase by a factor of four or more during storage at 325±0.5° F. (163±2.8° C.) for seven days. In one non-limiting embodiment of the invention, the viscosity does not increase by a factor of two or more during storage at 325° F. (163° C.) for seven days. Alternatively, the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially unblown or unoxidized solid or semi-solid materials at room temperature that gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400 at 25° C., and a typical penetration range between 40 and 300 (ASTM Standard, Method D-5). The viscosity of asphalt cement at 60° C. is more than about 65 poise. Asphalt cements are often defined in terms specified by the American Association of State Highway Transportation Officials (AASHTO) AR viscosity system.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052). For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. This is used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62–65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, -22, represents the minimum pavement design temperature in ° C. Other requirements of each grade are shown in the table. For example, the maximum value for the PAV-DSR test (° C.) for PG 64-22 is 25° C.

One of the methods commonly utilized in the industry to standardize the measure or degree of compatibility of the rubber with the asphalt is referred to as the compatibility test. The test comprises the mixing of the rubber and asphalt with all the applicable additives, such as the crosslinking agents. The mixture is placed in tubes, usually made of aluminum or similar material, referred to as cigar tubes or toothpaste tubes. These tubes are about one inch in diameter and about fifty centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, most states require a difference of 4° F. (2° C.) or less to consider the asphalt/rubber composition as compatible. Few standards allow a higher difference. The twenty-four hour test is used as a common comparison point.

In accordance with one non-limiting embodiment of the present invention, an asphalt composition is prepared by adding the asphalt or bitumen to a mixing tank that has stirring means. The asphalt is added and stirred at elevated temperatures. Stirring temperatures depend on the viscosity of the asphalt and can range up to 500° F. (260° C.). Asphalt products from refinery operations are well known in the art. For example, asphalts typically used for this process are obtained from deep vacuum distillation of crude oil to obtain a bottom product of the desired viscosity or from a solvent deasphalting process that yields a demetalized oil, a resin fraction and an asphaltene fraction. Some refinery units do not have a resin fraction. These materials or other compatible oils of greater than 450° F. (232° C.) flash point may be blended to obtain the desired viscosity asphalt.

Rubbers, elastomeric polymers, or thermoplastic elastomers suitable for this application are well known in the art as described above. For example, FINAPRENE® products available from Atofina Petrochemicals Inc. are suitable for the applications of the present invention. This example is not limiting for the inventive technology that can be applied to any similar elastomeric product particularly those produced from styrene and butadiene.

Various crosslinking agents for asphalt applications were tested as shown in Table I below. In one non-limiting embodiment, elemental sulfur, a nitrogen-containing thiol accelerator and zinc oxide compounds are used. These crosslinking agents are normally sold in powder or flake form.

The experimental procedure for the Examples of Table I involved formulating the blends with the indicated amount of asphalt and the indicated amount of FINAPRENE 502, crosslinked with the indicated ZnO/accelerator/sulfur system. The blends were tested for 48 hour rubber compatibility and SUPERPAVE SP-1 PG76-22 specifications. The asphalt sample was heated to 350° F. (177° C.) with low shear mixing. The mixing was changed to high shear and the polymer was added. Mixing continued on high shear for 1 hour at 350° F. (177° C.). The mixing was then reduced to low shear. The crosslinking agents were added and mixing was continued on low shear at 350° F. (177° C.) for 1 hour. The mixture was cured in an oven at 325° F. (163° C). The samples were removed at the designated times and tested. After 24 hours, the remaining sample was removed and tested for 48 hour compatibility and SUPERPAVE SP-1 PG76-22 specifications.

percent rubber increase in the Spread. The overall Rubber Response for the MBO crosslink blend was increased by 0.28° C. per percent rubber. The spread of the MMTD crosslink blend (Ex. 3B) increased by 0.7° C., which calculates to a 0.20° C. per percent rubber increase in the Spread; the overall Rubber Response for the MMTD crosslink blend was increased by 0.25° C. per percent rubber.

In all examples, the gap/separation between the unaged Binder and RTFO DSR Temperature was greater after 24 hours than after 6 hours aging. The unaged Binder DSR Temperature was maximized, in all cases, after the full 24 hour cure time. This is an indication that the RTFO DSR Temperature response is not so dependent on cure time, therefore, and not so dependent on completed polymer crosslinking, as is the unaged Binder DSR Response. Without wishing to be limited to any particular theory, it is supposed then that the RTFO DSR response (measurement) is more dependent on oxidative hardening of the asphalt, than is the unaged Binder DSR Temperature. Low temperature properties, as measured by the BBR m-Value and S-Value Temperatures, showed little statistical change.

Two compounds that are alternative crosslink accelerators to MBT, 2-mercaptothiazoline and

TABLE I

Evaluation of Alternate Accelerators in Asphalt Crosslinking System

| Blends | Units | Neat | 1 | 1A | 1B | 2 | 2A | 2B | 3 | 3A | 3B |
|---|---|---|---|---|---|---|---|---|---|---|---|
| Asphalt A | % | 100 | 96.5 | 96.5 | 96.5 | 96.5 | 96.5 | 96.5 | 96.5 | 96.5 | 96.5 |
| FINAPRENE 502 | % |  | 3.5 | 3.5 | 3.5 | 3.5 | 3.5 | 3.5 | 3.5 | 3.5 | 3.5 |
| ZnO | % |  | 0.06 | 0.06 | 0.06 | 0.06 | 0.06 | 0.06 | 0.06 | 0.06 | 0.06 |
| MBT | % |  | 0.06 |  |  |  |  |  |  |  |  |
| MMTD |  |  |  |  |  | 0.06 |  |  |  |  |  |
| MBO |  |  |  |  |  |  |  |  | 0.06 |  |  |
| Sulfur | % |  | 0.12 |  |  | 0.12 |  |  | 0.12 |  |  |
| Cure Time |  |  | 6 | 12 | 24 | 6 | 12 | 24 | 6 | 12 | 24 |
| Comp. Top # | ° F. |  | N/A | N/A | 170.7 | N/A | N/A | 172.6 | N/A | N/A | 168.9 |
|  | (° C.) |  |  |  | (77) |  |  | (78) |  |  | (76) |
| Delta T | ° F. |  | N/A | N/A | −0.7 | N/A | N/A | 2.0 | N/A | N/A | 1.9 |
|  | (° C.) |  |  |  | (−0.4) |  |  | (1.1) |  |  | (1.0) |
| Binder DSR | ° C. | 68.4 | 83.1 | 83.4 | 84.2 | 82.6 | 84.1 | 85.2 | 81.5 | 82.9 | 84.5 |
| RTFO DSR | ° C. | 69.4 | 79.9 | 80.2 | 79.8 | 79.2 | 79.1 | 80.8 | 80.8 | 79.9 | 80.7 |
| PAV DSR | ° C. | 26.4 | — | — | 24.9 | — | — | 26.3 | — | — | 24.9 |
| M-Value | ° C. | −10.38 | — | — | −14.03 | — | — | −13.91 | — | — | −13.83 |
| S-Value | ° C. | −14.44 | — | — | −16.07 | — | — | −15.66 | — | — | −15.60 |
| Compatibility |  |  |  |  | 0.7 |  |  | 2.0 |  |  | 1.9 |
| Spread |  |  |  |  | 93.8 |  |  | 94.7 |  |  | 94.5 |
| Rubber Response | ° C./% |  |  |  | 3.26 |  |  | 3.54 |  |  | 3.51 |

All percents are weight percents. All blends looked very smooth and there was no trouble with films after aging. It may be seen that the results from the inventive Examples 2 and 3 compared favorably to the comparative, conventional system of Example 1.

All blends were compatible. The final cured PMA blends (for 24 hours) met minimum specifications for PG76-22 PMA (SP-1). The Rubber Response for the control blend (Ex. 1B) was 3.26° C. per percent Finaprene 502. This is within the normal range for Asphalt A. The Rubber Response for each of the two alternative thiol accelerators was increased, relative to the Control blend. The increase was approximately 0.25° C. per percent rubber for each of the alternative accelerators. The increase in Rubber Response was not due to a wholesale shift in the Spread to higher temperatures, but mostly due to an actual increase in the High-Low (Temperature) Spread, with most of the increase coming in the high-temperature response(s). Specifically, the Spread of the MBO crosslink blend (Ex. 2B) increased by 0.9° C., which calculates to a 0.26° C. per 2-mercaptobenzimidazole, were tested for activity in PMA formulations. The base stock was SP-1 graded. A PMA Control blend and PMA blends with each of the alternative accelerators was formulated and graded. The results of the PMA testing are presented in Table II.

TABLE II

PMA Crosslinked with Alternative Accelerators.

|  | Units | 4 | 5 | 6 | 7 |
|---|---|---|---|---|---|
| Asphalt A | Wt % | 100 | 96.0 | 96.0 | 96.0 |
| FINAPRENE 502 | Wt % |  | 4.0 | 4.0 | 4.0 |
| ZnO | Wt % |  | 0.075 | 0.075 | 0.075 |
| MBT | Wt % |  | 0.075 |  |  |
| Sulfur | Wt % |  | 0.15 | 0.15 | 0.15 |
| 2-mercapto-thiazoline | Wt % |  |  | 0.075 |  |
| 2-mercapto-benzimidazole | Wt % |  |  |  | 0.075 |

TABLE II-continued

PMA Crosslinked with Alternative Accelerators.

| | Units | 4 | 5 | 6 | 7 |
|---|---|---|---|---|---|
| Binder DSR | °C. | 68.4 | 85.0 | 85.9 | 85.4 |
| RTFO DSR | °C. | 69.4 | 79.5 | 80.3 | 82.2 |
| PAV DSR | °C. | 26.4 | 21.9 | 21.5 | 22.6 |
| m-Value | °C. | -12.5 | -14.6 | -15.4 | -15.5 |
| S-Value | °C. | -13.6 | -16.3 | -16.7 | -16.3 |
| Compatibility | °F. | | 0.0 | 1.1 | 0.5 |
| 135° C. Viscosity | Pa * s | | 2.13 | 2.27 | 2.20 |
| Rubber Response | °C./% | | 2.78 | 2.98 | 3.45 |

All of the blends were compatible and met minimum target SP-1 PG76-22 specifications. The ODSR (original or binder DSR) Fail Temperature remained fairly constant in all of the blends. However, the limiting RTFO DSR Temperature was significantly improved/increased in the PMA blend crosslinked with 2-mercaptobenzimidazole (Blend #7, Table II). As a result, the Rubber Response of Blend #7 was improved to 3.45° C./% FINAPRENE 502, compared to the Control Blend (Blend #5, Table II) Rubber Response of 2.78° C./% FINAPRENE 502. The RTFO DSR Fail Temperature of Blend #6, crosslinked with 2-mercaptothiazoline was slightly improved, but falls within the ±1° C. variance of the test.

In the foregoing specification, the invention has been described with reference to specific embodiments thereof, and has been demonstrated as effective in providing methods for preparing asphalt and polymer compositions using accelerators other than MBT. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations or amounts of asphalt, polymer, crosslinker, activator, accelerator, and other components falling within the claimed parameters, but not specifically identified or tried in a particular PMA system, are anticipated and expected to be within the scope of this invention. Further, the methods of the invention are expected to work at other conditions, particularly temperature, pressure and proportion conditions, than those exemplified herein.

We claim:

1. A method for preparing asphalt and polymer compositions comprising:
   heating an asphalt;
   adding a styrene-butadiene copolymer to the asphalt;
   adding a crosslinker to the copolymer;
   adding an activator to the copolymer; and
   adding an accelerator in an amount sufficient to improve crosslinking, where the accelerator a nitrogen-containing thiol having the functional group —N═C (SH)—, in the absence of mercaptobenzothiazole (MBT).

2. The method of claim 1 where in adding the crosslinker, the crosslinker comprises sulfur.

3. The method of claim 1 where in adding the accelerator, the accelerator is selected from the group consisting of 2-mercaptobenzoxazole (MBO), 2-mercapto-5-methyl-1,3,4thiadiazole (MMTD), thiourea, 2-mercaptobenzimidazole, 2-mercaptothiazoline, and mixtures thereof.

4. The method of claim 1 where in adding the accelerator, the accelerator present from about 0.005 to about 0.3 wt. percent based on the asphalt.

5. A method for preparing asphalt and polymer compositions comprising:
   heating an asphalt;
   adding a polymer to the asphalt;
   adding a crosslinker to the polymer;
   adding an activator to the polymer; and
   adding an accelerator in an amount sufficient to improve crosslinking, where the accelerator is selected from the group consisting of 2-mercaptobenzoxazole (MBO), 2-mercapto-5-methyl-1,3,4-thiadiazole (MMTD), 2-mercaptobenzimidazole, thiourea, 2-mercaptothiazoline, mercaptobenzothiazole (MBT), and combinations thereof where at least MMTD or MBO is included as an accelerator.

6. The method of claim 5 where in adding the polymer, the polymer is a thermoplastic elastomer.

7. The method of claim 6 where the thermoplastic elastomer is a styrene-butadiene copolymer.

8. The method of claim 5 where in adding the crosslinker, the crosslinker is sulfur.

9. The method of claim 5 where in adding the accelerator, the accelerator is present in an amount ranging from about 0.005 to about 0.3 wt. percent based on the asphalt.

10. An asphalt and polymer composition prepared by the process comprising:
    heating an asphalt;
    adding a styrene-butadiene copolymer to the asphalt;
    adding a crosslinker to the copolymer;
    adding an activator to the copolymer, and
    adding an accelerator in an amount sufficient to improve crosslinking, where the accelerator is nitrogen-containing thiol having the functional group —N═C (SH)—, in the absence of mercaptobenzothiazole (MBT).

11. The composition of claim 10 where in adding the crosslinker, the crosslinker is sulfur.

12. The composition of claim 10 where in adding the accelerator, the accelerator is selected from the group consisting of 2-mercaptobenzoxazole MBO), 2mercapto-5-methyl1,3,4-thiadiazole (MMTD), thiourea, 2-mercaptobenzimidazole, 2-mercaptothiazoline, and mixtures thereof.

13. The composition of claim 10 where in adding the accelerator, the accelerator is present in an amount ranging from about 0.005 to about 0.3 wt. percent based on the asphalt.

14. An asphalt and polymer composition prepared by the process comprising:
    heating an asphalt;
    adding a polymer to the asphalt;
    adding a crosslinker to the polymer;
    adding an activator to the polymer; and
    adding an accelerator in an amount sufficient to improve crosslinking, where the accelerator is selected from the group consisting of 2-mercaptobenzoxazole (MBO), 2-mercapto-5-methyl-1,3,4-thiadiazole (MMTD), 2-mercaptobenzimidazole, thiourea, 2-mercaptothiazoline, mercaptobenzothiazole (MBT), and combinations thereof where at least MMTD or MBO is included as an accelerator.

15. The composition claim 14 where in adding the polymer, the polymer is styrene-butadiene copolymer.

16. The composition of claim 14 where in adding the accelerator, the accelerator is present in an amount ranging from about 0.005 to about 0.3 wt. percent based on the asphalt.

17. A method for preparing asphalt and polymer compositions comprising:
   heating an asphalt;
   adding a polymer to the asphalt;
   adding a crosslinker to the polymer;
   adding an activator to the polymer; and
   adding from about 0.005 wt. % to about 0.3 wt. % of an accelerator to the polymer wherein the accelerator is a nitrogen-containing thiol having the functional group —N=C(SH)—, in the absence of mercaptobenzothiazole (MBT).

* * * * *